United States Patent [19]

Anderson et al.

[11] Patent Number: 5,280,402
[45] Date of Patent: Jan. 18, 1994

[54] COMBINED STEPPER MOTOR AND VOICE COIL HEAD POSITIONING APPARATUS

[75] Inventors: James S. Anderson, Chanhassen; Noel L. Allen, Roseville; Durkee B. Richards, Stillwater; Theodore A. Schwarz, Woodbury; Robert W. Tapani, Oakdale; Hung T. Tran, Woodbury; Robert J. Youngquist, White Bear Lake, all of Minn.

[73] Assignee: Minnesota Mining and Manufacturing Company, Saint Paul, Minn.

[21] Appl. No.: 917,523

[22] Filed: Jul. 17, 1992

Related U.S. Application Data

[63] Continuation-in-part of Ser. No. 755,505, Aug. 30, 1991, abandoned.

[51] Int. Cl.[5] .................. G11B 5/55; G11B 21/02
[52] U.S. Cl. .................. 360/106; 360/77.12; 360/78.02; 360/75
[58] Field of Search .......... 360/106, 109, 104, 93, 360/78.02, 107, 90, 78.05, 78.13, 77.06, 77.02, 77.08, 77.12, 95, 75

[56] References Cited

U.S. PATENT DOCUMENTS

| | | | |
|---|---|---|---|
| 3,692,255 | 9/1972 | Von Behren | 242/192 |
| 4,313,143 | 1/1982 | Zarr | 360/106 |
| 4,630,147 | 12/1986 | Nagase | 360/106 |
| 4,677,505 | 6/1987 | Nukada et al. | 360/77.12 |
| 4,713,707 | 12/1987 | Heizmann | 360/106 |
| 4,717,978 | 1/1988 | Ichinose | 360/106 |
| 4,750,067 | 6/1988 | Gerfast | 360/106 |
| 4,858,047 | 8/1989 | Cannon et al. | 360/106 |
| 4,985,787 | 1/1991 | Kikuchi et al. | 360/78.02 |
| 5,008,765 | 4/1991 | Youngquist | 360/78.02 |
| 5,050,025 | 9/1991 | Carlson | 360/106 |
| 5,105,322 | 4/1992 | Steltzer | 360/106 |
| 5,148,336 | 9/1992 | Asai et al. | 360/95 |
| 5,148,341 | 9/1992 | Fehrenbach et al. | 360/106 |
| 5,191,492 | 3/1993 | Nayak et al. | 360/78.02 |
| 5,196,969 | 3/1993 | Iwamatsu et al. | 360/75 |
| 5,198,947 | 3/1993 | Nayak et al. | 360/109 |

FOREIGN PATENT DOCUMENTS 56-74822 6/1981 Japan .
2115210 1/1983 United Kingdom .

OTHER PUBLICATIONS

Abstract No. AN 91-366799, Derwent Publications Ltd., London, Great Britain, Week 9150, Nov. 10, 1991.

Primary Examiner—Paul M. Dzierzynski
Assistant Examiner—Kim-Kwok Chu
Attorney, Agent, or Firm—Gary L. Griswold; Walter N. Kirn; William B. Barte

[57] ABSTRACT

A mechanism for accurately following the center of a track includes a voice coil, or a voice coil and stepper motor in combination. The voice coil and stepper motor combination operate to variably position a recording head transversely with respect to the width of the recording tape. The mechanism enables head positioning with very close tolerances due to the ability of the voice coil to finely position the head very accurately on the center of a track.

19 Claims, 6 Drawing Sheets

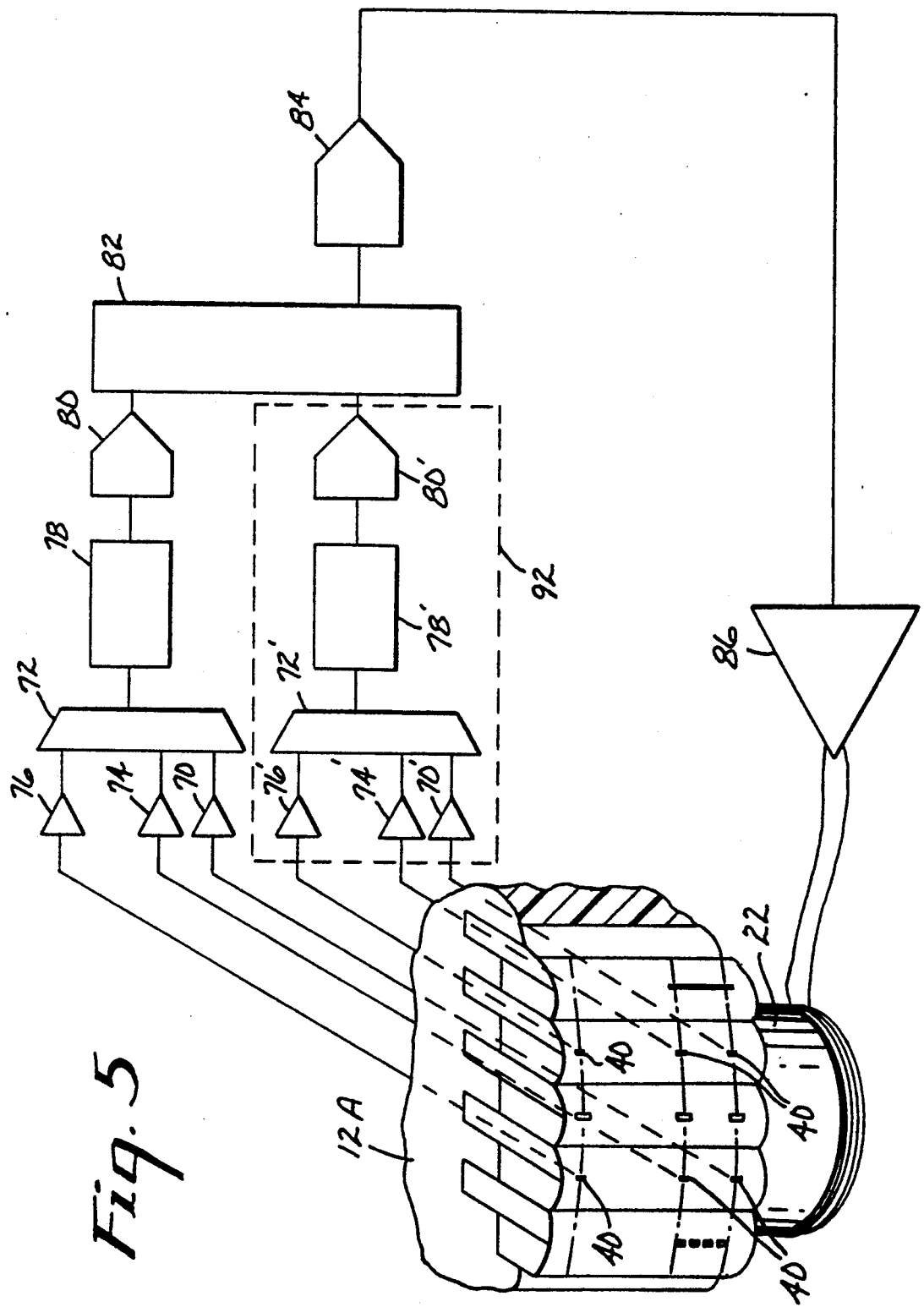

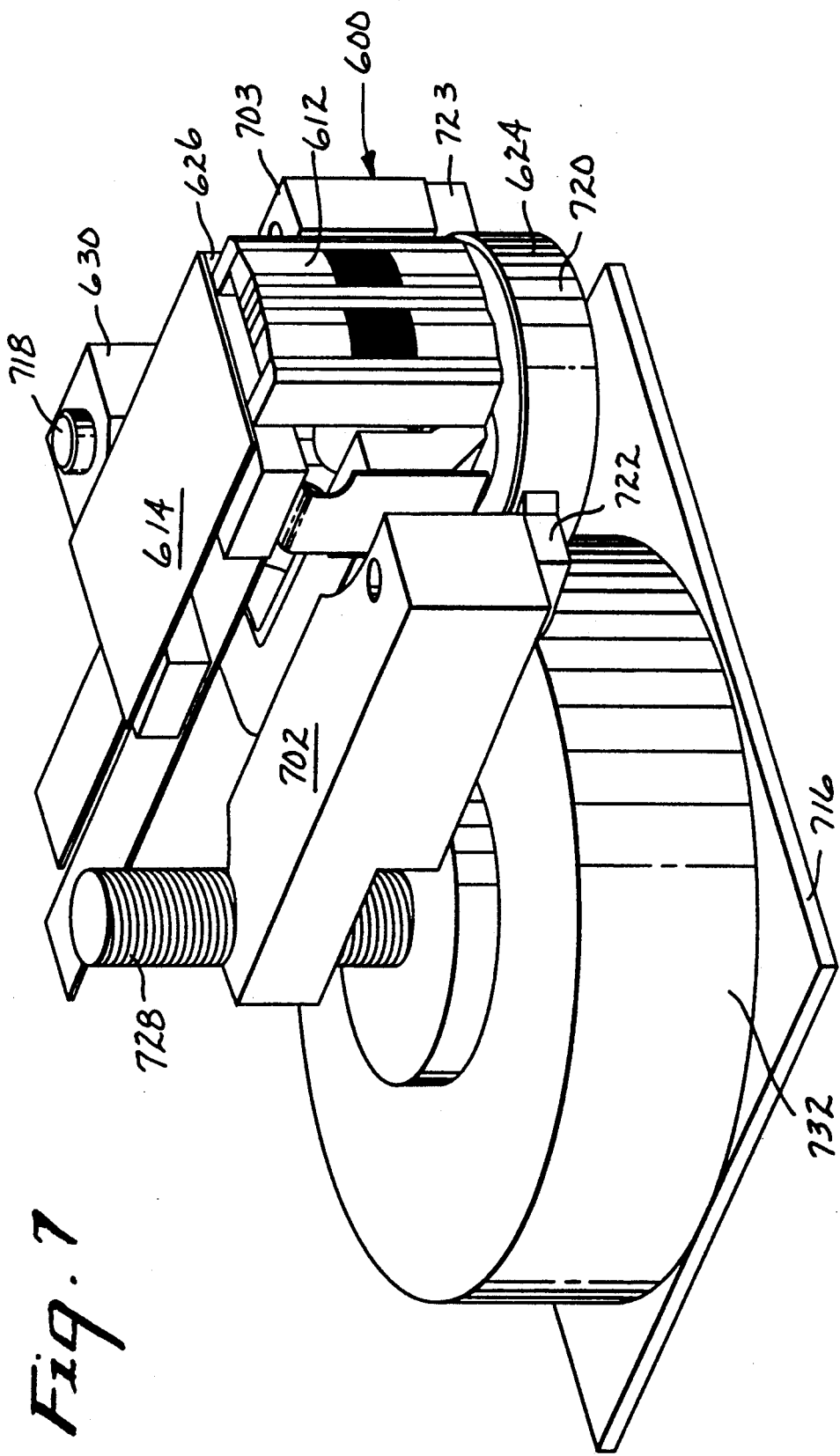

COMBINED STEPPER MOTOR AND VOICE COIL HEAD POSITIONING APPARATUS

CROSS REFERENCE TO RELATED APPLICATIONS

This application is a continuation-in-part of co-pending U.S. application Ser. No. 07/755,505, filed Aug. 30, 1991, now abandoned entitled: "HEAD POSITIONING MECHANISM FOR MULTI-TRACK TAPE RECORDER" and assigned to the same assignee as this application.

BACKGROUND OF THE INVENTION

1. Field of the Invention

The present invention relates to magnetic tape recorders and to subassemblies utilized therein, particularly with respect to recorders adapted for multiple track recording using a servoed multiple track head which is transversely movable with respect to the recording tape.

2. Description of the Prior Art

Data recording cartridges and recorders adapted for their use are disclosed and claimed in U.S. Pat. No. 3,692,225 (Von Behren). The cartridge there disclosed includes an enclosure together with an endless flexible belt in frictional contact with the tape on both reel hubs for bidirectionally driving the tape. The cartridge can operate to drive the tape with rapid accelerations and decelerations, such as are encountered in digital data recording and playback. Recorders adapted to use such data cartridges originally employed fixed, multi-track heads which were complex, expensive and difficult to maintain in proper alignment.

To eliminate the multi-track heads, U.S. Pat. No. 4,313,143 (Zarr) disclosed a head positioning mechanism by which a single track head could be transversely positioned with respect to the width of the recording tape to enable recording and playback of any of a plurality of parallel tracks.

U.S. Pat. No. 4,750,067 (Gerfast) discloses a head positioning mechanism for a multi-track data cartridge recorder including a stepper motor, a lead screw driven by the stepper motor and a head mounting slide engaged with the lead screw by a partial female thread. The Gerfast mechanism moves a recording/playback head transverse to the path of a magnetic recording tape.

While the Gerfast mechanism works satisfactorily for some applications, a need has recently arisen to provide a mechanism which more accurately positions a magnetic recording head on the center of a selected track in response to servo signals derived from servo information carried on certain tracks on a multi-track tape. This accurate positioning is required to allow substantially higher track densities on recording tape.

SUMMARY OF THE INVENTION

In contrast to any of the techniques previously employed, and, in particular, to provide a mechanism for accurately following the center of a track, the present invention provides a voice coil and stepper motor head positioning mechanism for a data cartridge recorder which utilizes a voice coil, or a voice coil and stepper motor combination to variably position a recording head transversely with respect to the width of the recording tape. The mechanism of the invention enables head positioning with very close tolerances due to the ability of the voice coil to finely position the head very accurately on the center of a track in response to servo signals carried by the tape.

In another aspect of the invention, the voice coil and magnet assembly travel with the recording head as it is coarsely positioned by the stepper motor. The voice coil then is activated for fine positioning of the recording head onto a selected tract thereby allowing use of a smaller voice coil assembly than devices having a magnet assembly mounted on a fixed base.

In yet another aspect of the invention, the stepper motor and head positioning assembly are located on a canted axis relative to the plane of the tape so as to position the recording head within a limited form factor as, for example, in a 5.25 inch form factor 1/4 inch tape drive.

BRIEF DESCRIPTION OF THE DRAWINGS

The present invention will be more thoroughly described with reference to the accompanying drawings, wherein like numbers refer to like parts in the several views, and wherein:

FIG. 5 is a schematic view of a detail of the magnetic head assembly of the present invention coupled to a servo loop;

DETAILED DESCRIPTION OF THE PREFERRED EMBODIMENT

Figure 2:
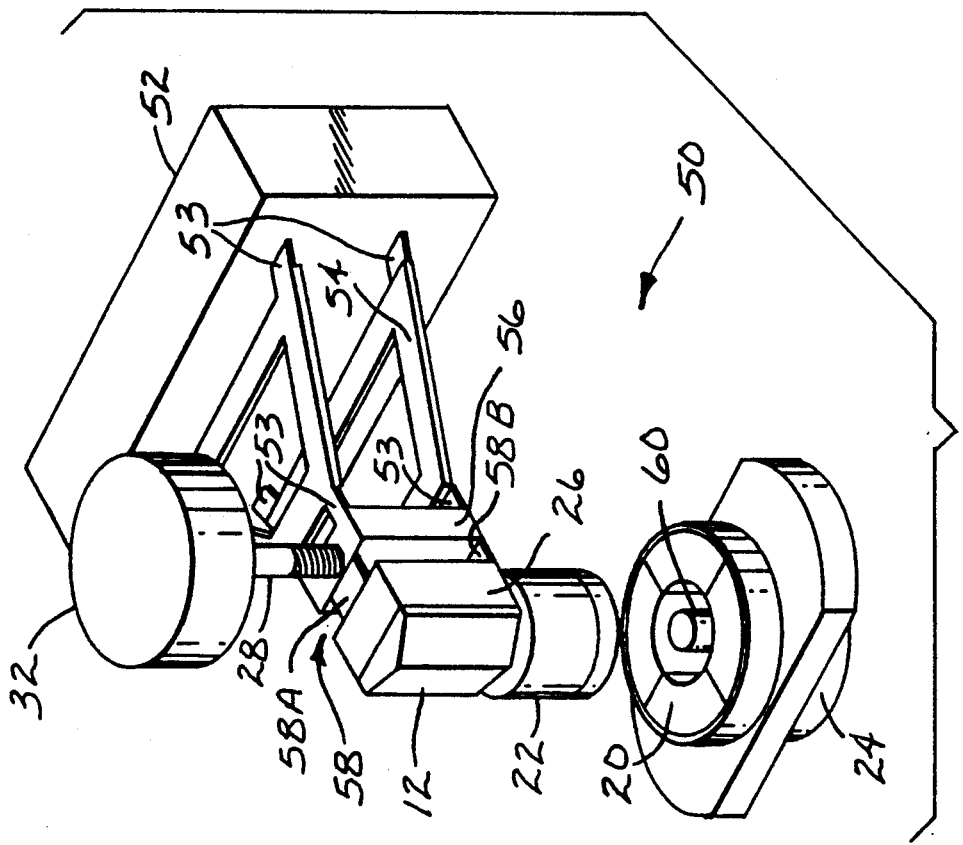
FIG. 2 is an isometric view of another, alternative embodiment cf the magnetic head assembly of the present invention.

As noted above, FIGURE is an isometric view of one embodiment of the magnetic head assembly of the present invention. As seen therein, the assembly 10 includes a support base 16. A head mounting slide 30 is slideably mounted on a cylindrical shaft 18 extending from the mounting base 16. A stepper motor 32, such as is shown in FIG. 2, drives a lead screw 28 which, in turn moves the head mounting slide 30 in a vertical direction perpendicular to the surface of the base 16.

The head mounting slide 30 further includes first and second cantilever springs 14 which are arranged parallel to each other and vertically spaced apart by a distance appropriate to engage a head mounting member 26 so as to allow movement in a direction perpendicular to the surface of the base 16 but to minimize rotation or movement in other directions. A magnetic recording head 12 is rigidly mounted to the head mounting member 26. A voice coil 22 is attached at a first end to the head mounting member at a point along a line (not shown) whose axis intersects the center of mass of the combined head and head mounting member in the direction of movement.

The voice coil 22 is positioned at a second end in a conventional manner within a housing 24 which houses magnet 20. A washer-shaped magnetic shield 21 may advantageously be placed between the magnetic recording head 12 and the magnet 20. To simplify the drawings, the magnetic shield is not shown in every FIGURE. However, it will be understood that it is employed in each embodiment of the invention discussed hereinafter. The magnetic recording head 12 is rigidly mounted to the head mounting member 26.

The magnetic recording head 12 may advantageously be a recording head within which are mounted a plurality of transducers including a servo write transducer and a servo erase transducer as shown in FIG. 5. The employment of such a head assembly in a multi-track servo recording head assembly is disclosed in detail in patent application Ser. No. 07/712,346, filed Jun. 7, 1991, which is assigned to the same assignee as the present application. Also as shown in FIG. 5, the magnetic recording head includes data read and write transducers. These transducers may operate to read a servo track which is utilized to supply a positioning signal to the magnetic recording head positioning mechanism. The present invention utilizes and responds to such servo signals.

Figure 1:
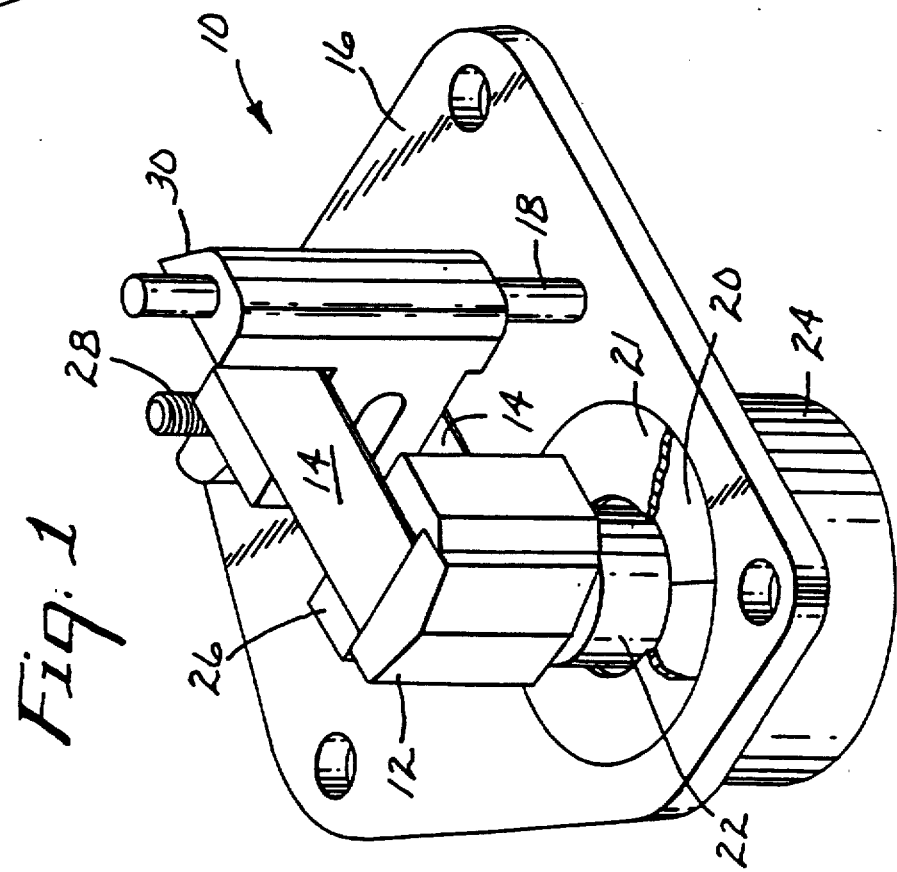
FIG. 1 is an isometric view of one embodiment of the magnetic head assembly of the present invention.

Still referring to FIG. 1, in operation, the stepper motor 32 is used to coarsely position the head from track to track and the voice coil responds to the servo signal in a track following mode to make extremely small adjustments, as for example, within micro-inches, to follow the center of the selected track. The leaf springs and voice coil design give the mechanism of the invention the ability to dynamically track the servo signal. Higher track density data cartridges are now made technically feasible as compared with conventional methods found in the prior art.

Now referring to FIG. 2, an alternate embodiment of a magnetic recording head positioning mechanism of the invention is shown. The recording head positioning mechanism of FIG. 2 generally designated as 50, includes a fixed mounting base 52, and substantially parallel cantilever arms 54 attached between the mounting base 52 and a moveable base 56 with leaf springs 53. A stepper motor lead screw 28 is threaded into the moveable base 56 and attached at one end to a stepper motor 32. A plurality of leaf springs generally designated 58, couples a magnetic head holding member 26 to the moveable base 56. The plurality of leaf springs may comprise at least one upper spring 58A and at least one lower spring 58B, wherein the upper and lower springs are vertically spaced apart so as to hold the assembly comprising the head 12 and the head holding member 26 transversely to a magnetic tape (not shown) which travels across the face of the magnetic recording head 12 from left to right or right to left.

The rest of the mechanism 50 is constructed similarly to the embodiment shown in FIG. 1 including a voice coil 22, magnet 20, and housing 24. Also shown in this view is a center post 60 which is part of the housing 24 and which provides a magnetic flux return path. In operation, the voice coil 22 is free to move vertically along the post 60, thereby moving the head 12. The leaf springs 58 provide a restoration force against the movement of the coil 22.

Figure 3:
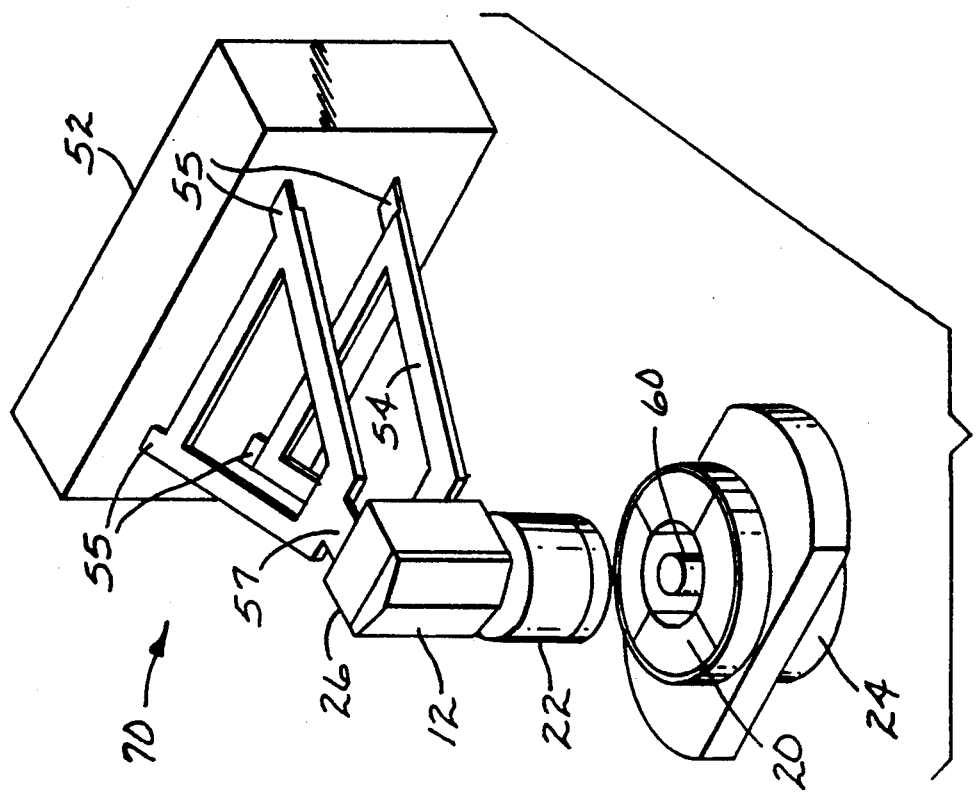
FIG. 3 is an isometric view of yet another alternative embodiment of the magnetic head assembly of the present invention.

Now referring to FIG. 3, an alternate embodiment of a magnetic recording head positioning mechanism of the invention is shown. The magnetic recording head positioning mechanism of FIG. 3, generally designated as 70, includes a fixed mounting base 52, and substantially parallel cantilever arms 54 attached between the mounting base 52 and a moveable head mounting member 26 by means of two sets of leaf springs 55 and 57 respectively.

In contrast to the embodiment shown in FIG. 2, no stepper motor is employed in this embodiment. Instead, the substantially parallel cantilever arms directly connect the magnetic head mounting member 26 to the fixed base 52. The substantially parallel cantilever arms 54 are vertically spaced apart so as to hold the assembly comprising the head 1 and the head mounting member 26 transverse to a magnetic tape which travels across the face of the magnetic recording head 12. The rest of the mechanism is constructed similarly to the embodiment shown in FIGS. 1 and 2 including a voice coil 22, magnet 20, center post 60 and housing 24. In this embodiment the leaf springs 55 and 57 provide a restorative force against the movement of the voice coil 22.

Figure 4:
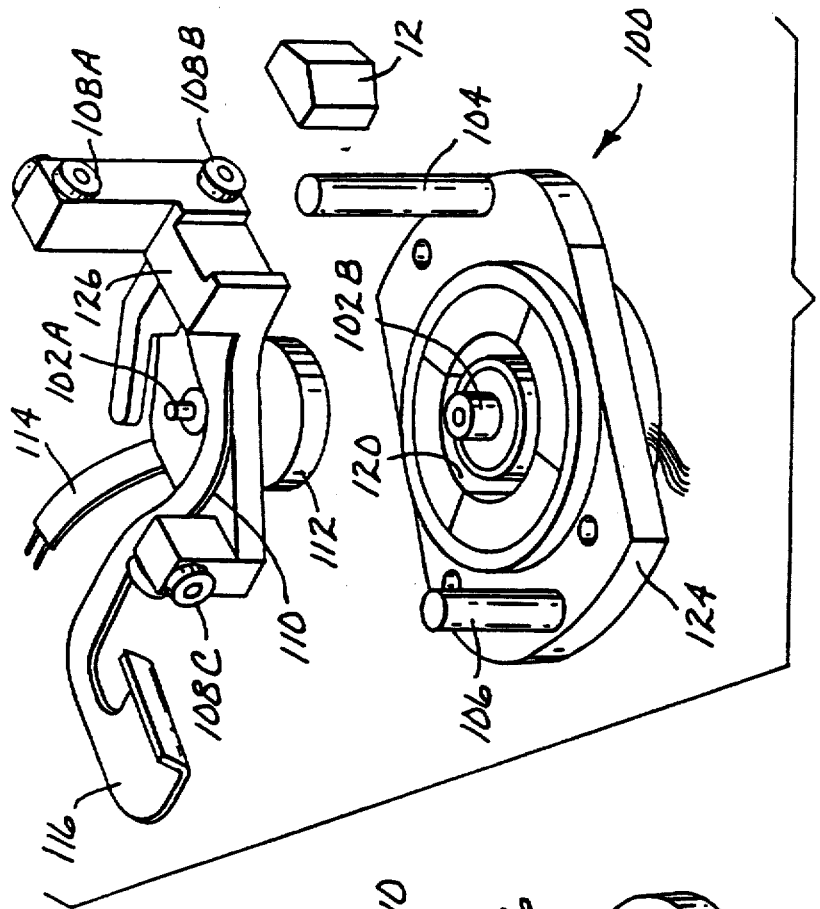
FIG. 4 is an exploded isometric view of still another alternative embodiment of the magnetic head assembly of the present invention.

Now referring to FIG. 4, yet another alternative embodiment of a magnetic recording head positioning mechanism is shown in an exploded view. The magnetic recording head mechanism is generally designated 100 and includes a housing 124 including a magnet 120. Mounted in the housing 124 is a first portion of a linear variable differential transformer (LVDT) 102B. The LVDT includes a second portion 102A mounted to an actuator member 110. Also mounted on the housing 124 are first and second guide posts 104, 106. The guide posts 104, 106 engage three sets of guide post bearings 108A, 108B and 108C. The guide post bearings 108A, 108B and 108C are mounted to the actuator member 110. The actuator member 110 further includes a recording head mounting block 126 attached to which is a recording head 12 Also attached to the actuator 110 is a magnetic coil 112. The magnetic coil 112 includes a coil strap 114 for bringing electrical signals to the magnetic coil. A head lead 116 is coupled to the recording head 12 for conducting electronic signals to and from the recording head 12 in a well known manner. In operation, the voice coil type magnetic recording head actuating system 100 responds to servo control signals carried on the coil strap 114 to accurately maintain the position of the magnetic recording head over a selected data track.

FIG. 5 illustrates schematically a closed loop head positioning servo system in the playback mode as described in the afore-referenced co-pending application with the addition of a magnetic head positioning mechanism of the instant invention. With the magnetic head 12A positioned to read servo data, the output of one of a plurality of data read transducers 40 (assuming forward motion of the not-shown media) is presented to a multiplexer 72 via one of a plurality of preamps 70, 74 or 76. It is this signal comprising alternating bursts of full amplitude and, nominally, one-half amplitude that provides servo control as described in the co-pending application.

The servo information is processed through a filter and demodulator 78, analog to digital converter 80, and digital signal processor 82 in order to compute a servo control signal. This servo control signal is then sent through the driver module 84 to power amplifier 86, causing the voice coil 22 to move the head 12A, thereby repositioning the magnetic recording head 12A such that the appropriate read transducer is centered over the center line of a respective servo track. It should be evident from FIG. 5 that the components of the servo mechanism contained in the block 92 are exactly the same as the elements above them and are used when the media is moving in the reverse direction.

Figure 6:
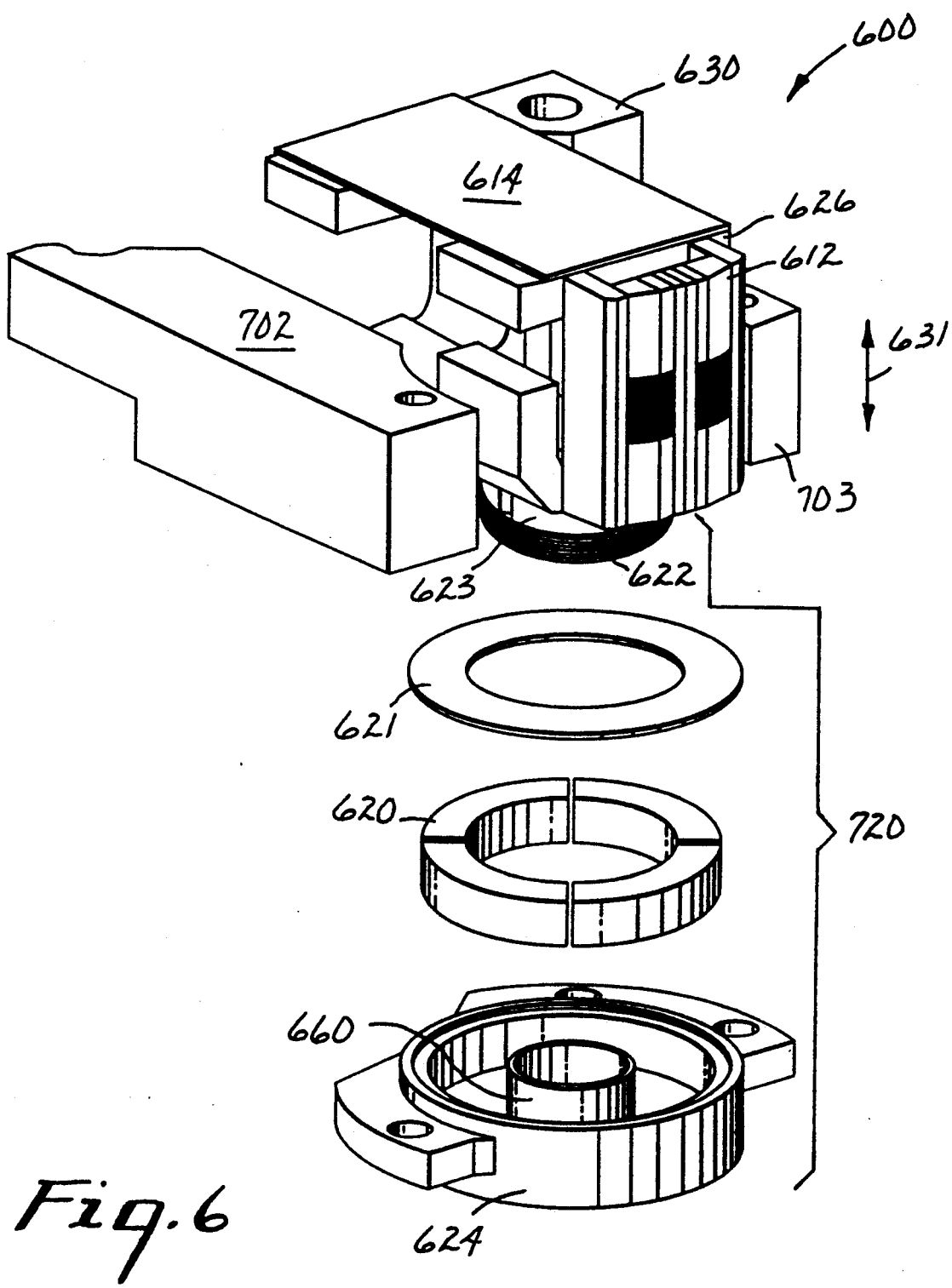
FIG. 6 is an exploded isometric view of an alternate embodiment of the magnetic head assembly of the present invention wherein the voice coil and magnet comprising the head positioning assembly travel with the recording head when it is coarsely positioned by a stepper motor.

Referring now to FIG. 6, an exploded isometric view of an alternate embodiment of the magnetic head positioning assembly 600 of the present invention is shown. As there is seen, the magnetic head assembly 600 includes a follower 630 attached to which are top and bottom cantilever springs, the top spring being shown in FIG. 6 as element 614. These springs are arranged parallel to each other and vertically spaced apart by a distance appropriate to engage a head mounting member 626 so as to allow vertical movement of the head mounting member 626 in a manner similar to the mechanism shown in FIG. 1. One cantilever spring, such as the top spring 614, may advantageously be made thinner and wider than the other cantilever spring so that the cantilever springs have different natural resonant frequencies. In such a case, the cantilever springs do not vibrate together at the same frequency, thereby alleviating unwanted motion of the magnetic recording head.

A magnetic recording head 612 is rigidly mounted to the head mounting member 626. A voice coil actuator assembly 720 includes a voice coil 622, a voice coil core 623, a magnetic shield 621, a magnet 620, and a magnet housing 624. The voice coil 622 is wound around the voice coil core 623 which is attached at a first end to the head mounting member.

In one embodiment, the voice coil 622 and voice coil core 623 may be affixed to the head mounting member 626 at a point along a line (not shown) whose axis intersects the center of mass of the combined head and head mounting member in the direction of movement generally indicated by arrow 631. Also shown in this view is a center post 660 which is part of the housing 624 and which provides a magnetic flux return path.

The voice coil 622 is positioned at a second end in a conventional manner within a housing 624 which houses magnet 620. A washer-shaped magnetic shield 621 may advantageously be placed between the magnetic recording head 612 and the magnet 620. The magnetic recording head 612 is rigidly mounted to the follower 630.

Figure 7:
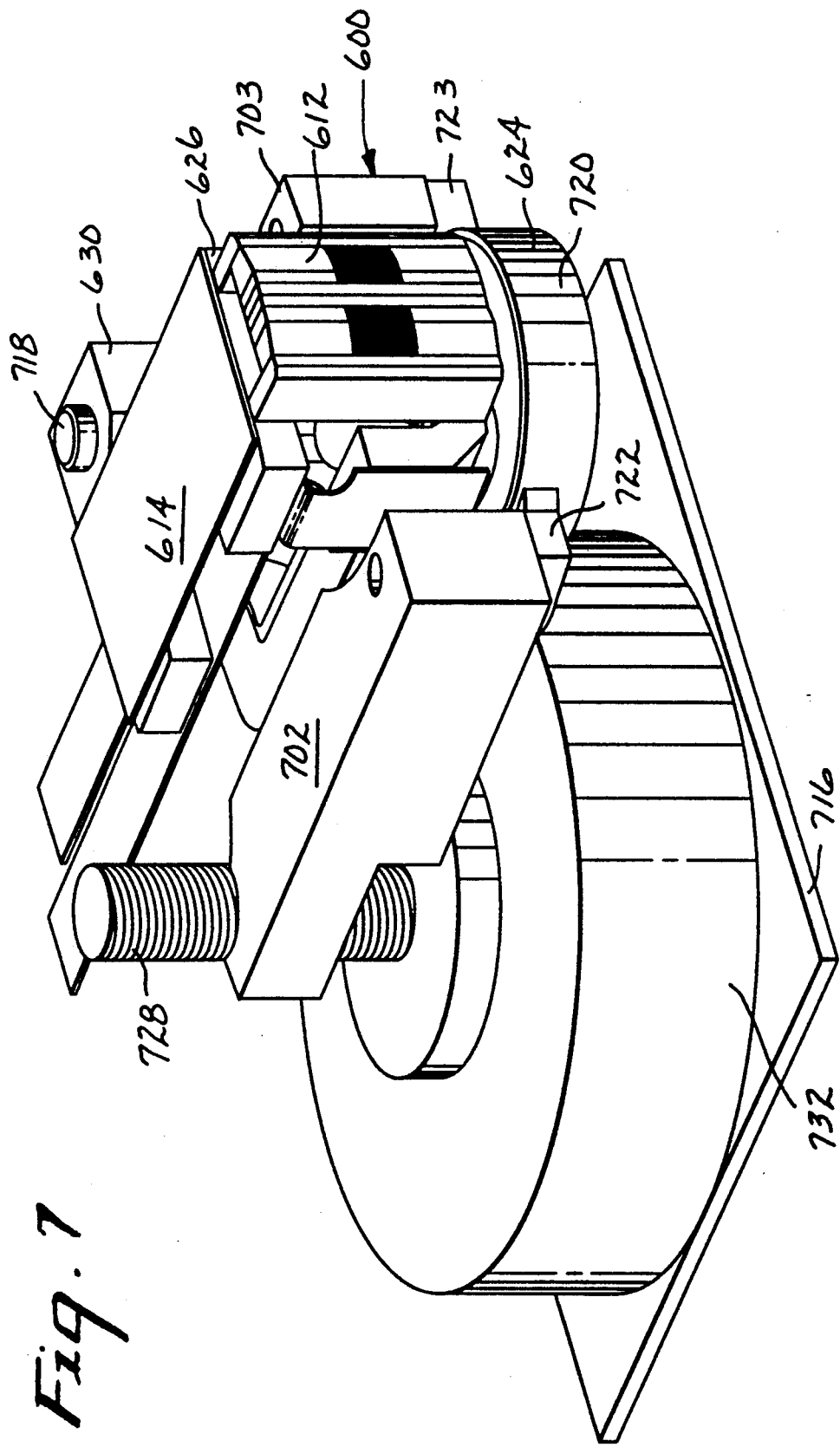
FIG. 7 is an isometric view of one embodiment of the head positioning assembly of FIG. 6.

Now referring to FIG. 7, an isometric view of the alternate embodiment of FIG. 6 is shown with a stepper motor 732 mounted to an appropriately configured base 716. The voice coil actuator assembly 720, including the magnet housing 624, is mounted to follower 630 by fastening flanges 722, 723 to opposing members 702, 703 of follower 630. The first member 702 of follower 630 is configured to have a threaded portion which engages lead screw 728. The second follower member 703 includes a bore for accepting the cylindrical shaft 718.

Still referring to FIG. 7, in operation, the stepper motor 732 is used to coarsely position the head from track to track by moving the follower 630 which, in turn, carries the recording head 612. The voice coil actuator assembly, including the magnet 620 within housing 624, being attached to the head mounting member 626 and follower 630, travels with the recording head 612. As a result, the range of vertical movement of the voice coil required to finely position the head is greatly reduced, resulting in a more uniform magnetic field surrounding the voice coil. As explained above, the voice coil responds to the servo signal in a track following mode to make extremely small adjustments, as, for example, within microinches, to follow the center of the selected track. The leaf springs and voice coil design give the mechanism the ability to dynamically track the servo signal. It will be understood by those skilled in the art that, although the embodiment of the invention shown in FIGS. 6 and 7 is described as employing a voice coil and magnet assembly as a fine positioning apparatus, the invention is not so limited. For example, other electromechanical means may be substituted for the voice coil and magnet assembly such as, for example, piezoelectric elements.

Figure 8:
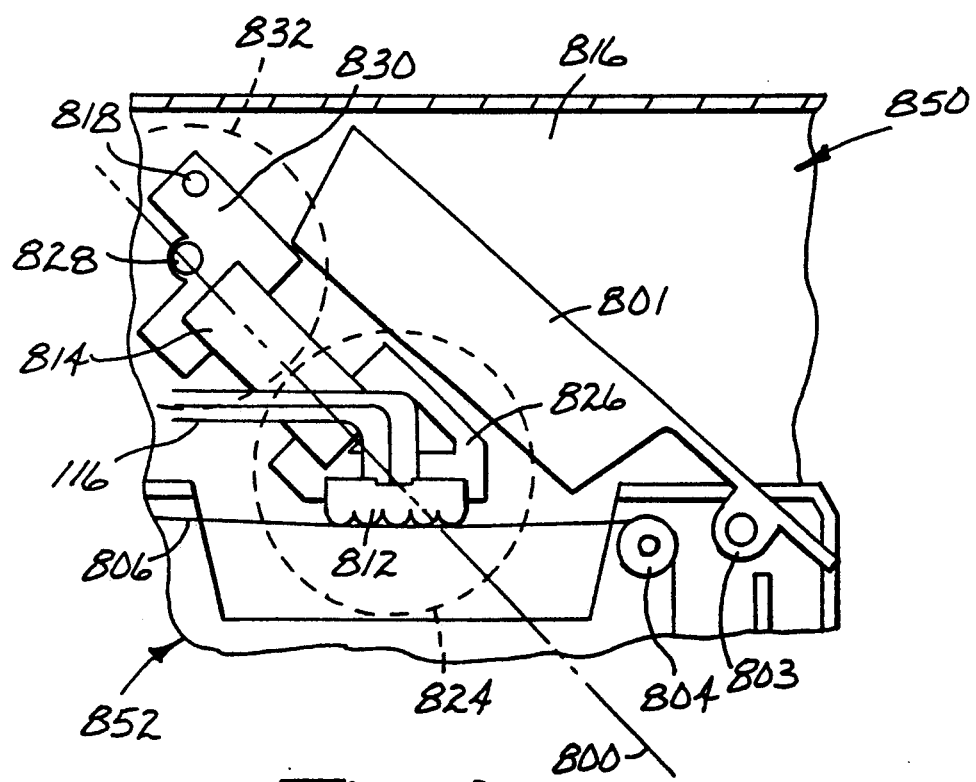
FIG. 8 shows a top view of another embodiment of the invention wherein a stepper motor and head positioning assembly are aligned on an axis canted at an oblique angle to the transport path of a magnetic tape.

FIG. 8 is a top view of another embodiment of the invention wherein a stepper motor 832 and magnetic assembly 824 in a tape drive 850 are aligned on an axis 800 canted at an oblique angle to the transport path of a magnetic tape in a tape cartridge 852. The tape cartridge 852 includes a tape cartridge door 801 hinged on a pin 803. The tape cartridge door 801 swings open into the tape drive 850 so as to allow a recording head 812 to access magnetic tape 806.

As in other embodiments described hereinabove, such as with respect to FIGS. 1 and 6, for example, a head positioning apparatus includes a mounting slide or follower 830, a cylindrical shaft 818 extending from a mounting base 816, a stepper motor 832, a lead screw 828, and first and second cantilever springs 814. The cantilever springs 814 are generally arranged as described hereinabove with respect to FIGS. 1 and 6, for example, to engage a head mounting member 826. In the embodiment of FIG. 8, the head positioning apparatus is arranged to be located along the canted axis 800. The magnetic recording head 812 is rigidly mounted to the head mounting member 826. The head mounting member 826 comprises an appropriately angularly shaped member so as to provide a mounting surface to hold the recording head 812 substantially parallel to the plane of the magnetic recording tape 806 while accommodating the canted arrangement of the head positioning apparatus. A voice coil, for example, is attached to the head mounting member 826 in a manner similar to the embodiments discussed hereinabove. The canted axis of the head positioning apparatus or actuator allows positioning of the recording head within a limited profile, such as, for example, within 5.25 inch form factor ¼ inch tape drive. The angle of the canted axis is designed to allow the head to clear the cartridge door when it is partially opened to provide access to the tape.

The invention has been described herein in considerable detail in order to comply with the Patent Statutes and to provide those skilled in the art with the information needed to apply the novel principle and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a tape drive adapted for recording on and playing back of data from any one of a multiplicity of parallel tracks extending the length of a recording tape and in which at least one recording/playback head, including a head mounting member, is adapted to contact the tape along a tape transport path and to be variably positioned transversely with respect to the tape, a head positioning mechanism comprising:
  (a) linear support means secured proximate to the tape transport path and generally perpendicular to a direction of motion of the recording tape;
  (b) a coarse positioning means engaged to vertically slide along the linear support means for coarsely positioning said at least one head in relation to a selected one of the multiplicity of recording tracks;
  (c) first spring restoration means affixed between said at least one head and the coarse positioning means to maintain said at least one head in a selected coarse track position in the absence of any counteracting force; and
  (d) means for finely positioning said at least one head in relation to the center of the selected recording track.

2. A head positioning mechanism according to claim 1 wherein the fine positioning means comprises a voice coil which drives said at least one head transversely to the direction of movement of the tape. a positioning.

3. A head positioning mechanism according to claim 2 wherein the voice coil is attached to said at least one head at a point along a line whose axis intersects the center of mass of said at least one head and the head mounting member.

4. A head positioning mechanism according to claim 1 wherein the coarse positioning means further comprises means for incrementally driving the coarse positioning means including:
  (a) a stepper motor secured relative to the tape transport path having a drive shaft rotatably mounted therein; and
  (b) means mounted to the drive shaft of the stepper motor for converting rotary motion of the shaft into corresponding linear movement.

5. A head positioning mechanism according to claim 4 wherein said linear support means includes a single cylindrical shaft which restrains the coarse positioning means to motion along a single axis.

6. A head positioning mechanism according to claim 1 wherein the fine positioning means comprises a voice coil and a magnet assembly wherein the voice coil and magnet assembly are affixed as to travel with said at least one head when it is coarsely positioned.

7. A head positioning mechanism according to claim 1 wherein said first spring restoration means and fine positioning means are arranged along an axis which is canted at an oblique angle to the tape transport path.

8. The head positioning mechanism according to claim 7 wherein said first spring restoration means and fine positioning means are arranged along said canted axis so as to accommodate a 5.25 inch form factor ¼ inch tape drive.

9. In a tape recorder adapted for recording on and playing back of data from any one of a multiplicity of parallel tracks extending the length of a magnetic recording tape and in which at least one recording/-playback head is adapted to interface with the tape along a tape transport path and to be variably positioned transversely with respect to the tape, a head positioning mechanism comprising:
  (a) support means secured proximate to a transport path;
  (b) movable means for mounting said at least one head;
  (c) spring restoration means connected between the head mounting means and the support means so as to maintain said at least one head in a predetermined position in the absence of any counteracting force; and
  (d) means for positioning said at least one head in relation to the center of the selected recording tract wherein the positioning means comprises a voice coil which drives said at least one head transversely to the direction of movement of the recording tape by applying a positioning force.

10. In a tape recorder adapted for recording on and playing back of data from any one of a multiplicity of parallel tracks extending the length of a recording tape and in which at least one recording/playback head is adapted to interface with the recording tape along a tape transport path and to be variably positioned transversely with respect to the tape, a head positioning mechanism comprising:
  (a) support means secured proximate to a transport path;
  (b) first spring restoration means affixed at a first end to the support means and having a second end;
  (c) a movable base means affixed at the second end of the first spring restoration means so as to maintain said at least one head in a predetermined position in the absence of any counteracting force;
  (d) a stepper motor secured relative to the tape transport path having a drive shaft rotatably mounted therein;
  (e) lead screw means mounted to the drive shaft of the stepper motor for converting rotary motion of the shaft into corresponding substantially linear movement wherein the lead screw means is threaded into the movable base means to vertically move the movable base means in a substantially linear direction transversely to the transport path;
  (f) a plurality of leaf springs attached between the movable base means and the means for mounting said at least one head; and
  (g) means for finely positioning said at least one head in relation to the center of the selected recording track.

11. A head positioning mechanism in accordance with claim 10 wherein the fine positioning means comprises a voice coil which drives said at least one head transversely to the direction of movement of the tape.

12. A head positioning mechanism according to claim 10 wherein the first restoration means comprises substantially parallel cantilever arms having leaf springs connecting them to the head mounting means and support means.

13. In a tape recorder adapted for recording on and playing back of data from any one of a multiplicity of parallel tracks extending the length of a magnetic recording tape and in which at least one recording/-playback head is adapted to interface with the tape along a tape transport path and to be variably positioned transversely with respect to the tape, a head positioning mechanism comprising:
  (a) a first linear support means secured proximate to a transport path and generally perpendicular to the direction of motion of the tape;
  (b) a second linear support means secured proximate to the transport path and generally perpendicular to the direction of motion of the tape;
  (c) an actuator member including in combination (i) a first bearing means engaged to slide along the first linear support means;

(ii) a second bearing means engaged to slide along the second linear support means;

(iii) a head mounting means for mounting said at least one head;

(iv) a voice coil and magnet for driving the actuator along said support means in response to signals supplied to said coil; and (d) means for sensing the position of said at least one head secured proximate to the transport path and for modifying said signals supplied to the coil in response to the sensed position.

14. The head positioning mechanism of claim 13 wherein the sensing means comprises a linear variable differential transformer (LVDT) mounted therein, and the coil and LVDT operate together so as to position said at least one head in relation to the center of a selected recording track.

15. A positioning method for a multi-channel head assembly for use in a tape recorder, wherein the tape recorder handles a multi-track tape, transported in a lengthwise direction by the tape recorder, wherein at least one of the tracks includes servo data, the method comprising the steps of:

(a) reading the servo data;

(b) generating a servo control signal as a function of the servo data; and (c) receiving the servo control signal and translating the servo control signal into a corresponding driving signal for driving a voice coil, the voice coil bearing against the head assembly in a location suitable for moving the head assembly transversely to the transport direction of the tape, so as to reposition the voice coil to a position consistent with the servo control signal so as to correct the head assembly position relative to the track including the servo data 16. A positioning system for a multi-channel head assembly for use in a tape recorder, wherein the tape recorder handles a multi-track tape, transported in a lengthwise direction by the tape recorder, wherein at least one of the tracks includes servo data, the system comprising:

(a) a magnetic recording head including at least one transducer means for reading the servo data;

(b) a voice coil bearing against the magnetic recording head in a location suitable for moving the magnetic recording head transversely to the transport direction of the tape;

(c) means coupled to said at least one transducer means and providing a servo track signal representative of the servo data;

(d) means coupled to the servo track signal for generating a servo control signal as a function of the servo track signal; and (e) driving means coupled to receive the servo control signal and translate the servo control signal into a corresponding driving signal for driving the voice coil so as to reposition the voice coil to a position consistent with the servo control signal so as to correct the head position relative to the track including the servo data.

17. A head positioning mechanism according to claim 16 wherein the voice coil is attached to said at least one head at a point along a line whose axis intersects the center of mass of said at least one head and an associated head mounting member.

18. The head positioning mechanism according to claim 16, further comprising means for coarsely positioning said head in relation to a said servo data track.

19. The head positioning mechanism according to claim 18, wherein said voice coil is mounted to said coarse positioning means to travel with said head as it is coarsely positioned and to thereafter provide fine position control.

* * * * *

UNITED STATES PATENT AND TRADEMARK OFFICE
CERTIFICATE OF CORRECTION

PATENT NO. : 5,280,402

DATED : January 18, 1994

INVENTOR(S) : Anderson et al.

It is certified that error appears in the above-indentified patent and that said Letters Patent is hereby corrected as shown below:

Col. 1, line 25, "3,692,225" should be --3,692,255--.

Col. 2, line 53, "FIGURE" should be --FIGURE 1--.

Col. 4, line 18, "1" should be --12--.

Col. 7, line 22, delete "a positioning.".

Signed and Sealed this

Twelfth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.: 5,280,402

DATED: January 18, 1994

INVENTOR(S): Anderson et al.

It is certified that error appears in the above-identified patent and that said Letters Patent is hereby corrected as shown below:

In the drawings, replace Sheet 1 of 6 (Fig. 7) with the attached sheet containing Fig. 1 and Fig. 4.

Signed and Sealed this

Twelfth Day of December, 1995

BRUCE LEHMAN

*Commissioner of Patents and Trademarks*